United States Patent
Gao et al.

(10) Patent No.: US 12,497,380 B2
(45) Date of Patent: Dec. 16, 2025

(54) METHOD OF ASYMMETRICALLY SYNTHESIZING NICOTINE

(71) Applicant: SHENZHEN CATALYS TECHNOLOGY CO., LTD, Shenzhen (CN)

(72) Inventors: Shuang Gao, Shenzhen (CN); Qiwei Lang, Shenzhen (CN); Xiaobing Ding, Shenzhen (CN)

(*) Notice: Subject to any disclaimer, the term of this patent is extended or adjusted under 35 U.S.C. 154(b) by 987 days.

(21) Appl. No.: 17/535,812

(22) Filed: Nov. 26, 2021

(65) Prior Publication Data

US 2022/0089564 A1    Mar. 24, 2022

Related U.S. Application Data

(63) Continuation of application No. PCT/CN2020/136696, filed on Dec. 16, 2020.

(30) Foreign Application Priority Data

Apr. 22, 2020  (CN) .......................... 202010321477.5

(51) Int. Cl.
*C07D 401/04*    (2006.01)
(52) U.S. Cl.
CPC .................................. *C07D 401/04* (2013.01)
(58) Field of Classification Search
CPC .. C07D 401/04; C07D 213/30; C07D 213/50; C07D 213/38; C07D 213/40; C07B 2200/07
See application file for complete search history.

(56) References Cited

U.S. PATENT DOCUMENTS

2016/0326134 A1    11/2016    Willis et al.

FOREIGN PATENT DOCUMENTS

| CN | 102617547 A | 8/2012 |
|---|---|---|
| CN | 104341390 A | 2/2015 |
| CN | 107406411 A | 11/2017 |
| CN | 108101820 A | 6/2018 |
| WO | 2014174505 A2 | 10/2014 |

OTHER PUBLICATIONS

Wu, Weilong, et al. "Enantioselective and Diastereoselective Construction of Chiral Amino Alcohols by Iridium-f-Amphox-Catalyzed Asymmetric Hydrogenation via Dynamic Kinetic Resolution." Organic Letters, vol. 19, No. 10, May 2017, pp. 2548-2551. https://doi.org/10.1021/acs.orglett.7b00844. (Year: 2017).*
Nishida, Toshiaki,et al. Carbon-13 nuclear magnetic resonance spectra of nicotine metabolites and related compounds. Organic Magnetic Resonance, 13(6), Dec. 31, 1980,pp. 434-437.
Hu, Yang,et al. Efficient access to chiral 1,2-amino alcohols via lr/f-amphox-catalyzed asymmetric hydrogenation of α-amino ketones. Organic Chemistry Frontiers, 4(8), Aug. 7, 2017,pp. 1499-1502.
Murahashi, S., Mitsui, H., Shiota, T., Tsuda, T., & Watanabe, S. (1990). Tungstate-catalyzed oxidation of secondary amines to nitrones. .alpha.-Substitution of secondary amines via nitrones. The Journal of Organic Chemistry, 55(6), 1736-1744.
Synthesis of nornicotine, nicotine and other functionalised derivatives using solid-supported reagents and scavengers. (2001). Journal of the Chemical Society, Perkin Transactions 1, (2), 143-154.
Bashiardes, G., Picard, S., & Pornet, J. (2009). Synthesis of Nicotine and Diverse Analogues Using Intramolecular [3+2] Cycloaddition. Synlett, 2009(15), 2497-2499.
Huang, K., Ortiz-Marciales, M., De JesÃ°s, M., & Stepanenko, V. (2009). A new and efficient approach to the synthesis of nicotine and anabasine analogues. Journal of Heterocyclic Chemistry, 46(6), 1252-1258.
Chavdarian, C. G., Sanders, E. B., & Bassfield, R. L. (1982). Synthesis of optically active nicotinoids. The Journal of Organic Chemistry, 47(6), 1069-1073.
Welter, C., Moreno, R. M., Streiff, S., & Helmchen, G. (2005). Enantioselective synthesis of (+)(R)- and (-)(S)-nicotine based on Ir-catalysed allylic amination. Organic & Biomolecular Chemistry, 3(18), 3266-3268.
Barker, G., McGrath, J. L., Klapars, A., Stead, D., Zhou, G., Campos, K. R., & O'Brien, P. (2011). Enantioselective, Palladium-Catalyzed α-Arylation ofN-Boc Pyrrolidine:In SituReact IR Spectroscopic Monitoring, Scope, and Synthetic Applications. The Journal of Organic Chemistry, 76(15), 5936-5953.

* cited by examiner

*Primary Examiner* — Clinton A Brooks
*Assistant Examiner* — Kyle Nottingham

(57) ABSTRACT

A method for preparing nicotine. (1) The nicotinic acid alkyl ester and N-methylpyrrolidone are subjected to a condensation reaction, and then added with a strong acid to obtain 4-methylamino-1-(3-pyridine)-butanone hydrochloride. (2) The 4-methylamino-1-(3-pyridine)-butanone hydrochloride is reacted with an amino-protecting reagent to obtain an intermediate (4). (3) A chiral alcohol (5) is obtained through an asymmetric reduction. (4) The chiral alcohol (5) is converted into the nicotine through a two-step reaction.

5 Claims, 5 Drawing Sheets

METHOD OF ASYMMETRICALLY SYNTHESIZING NICOTINE

CROSS-REFERENCE TO RELATED APPLICATIONS

This application is a continuation of International Patent Application No. PCT/CN2020/136696, filed on Dec. 16, 2020, which claims the benefit of priority from Chinese Patent Application No. 202010321477.5, filed on Apr. 22, 2020. The content of the aforementioned applications, including any intervening amendments thereto, is incorporated herein by reference in its entirety.

TECHNICAL FIELD

This application relates to chemical synthesis, and more particularly relates to a method for preparing nicotine through asymmetric reduction of an intermediate pyridyl alkyl ketone.

BACKGROUND

Nicotine is an alkaloid found in Solanaceae plants, and is an important active ingredient in tobacco. Naturally-occurring nicotine ((S)-nicotine) is a chiral amine alkaloid containing pyridine and tetrahydropyrrole, and has unique physiological activity due to its special structure. Nicotine has a wide application range, on one hand, nicotinic compounds are widely used as insecticides in agricultural production; and on the other hand, the nicotine can be used in the medicine field. It has been clinically demonstrated that the nicotine can act on acetylcholine receptors, and thus is expected to be effective in the treatment of central nervous system diseases such as dementia, parkinsonism, schizophrenia and depression. In addition, (S)-nicotine can also be used as a chiral ionic liquid in various asymmetric chemical reactions in the chemical synthesis.

It has been scientifically confirmed that the affinity of (S)-nicotine to acetylcholine receptors is 10-100 times that of (R)-nicotine. Therefore, the (S)-nicotine has a wider application in the market. However, the commercially-available (S)-nicotine is mainly derived from plants, and thus its resource is affected by many factors such as raw materials, climate and growth cycle. In view of this, the extraction of (S)-nicotine from plants cannot meet the commercial needs, and it is of great significance to develop a chemical synthesis approach of (S)-nicotine to achieve the large-scale production of (S)-nicotine.

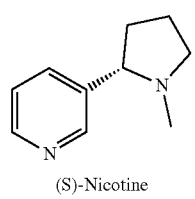

(S)-Nicotine

Extensive researches have been conducted on the chemical synthesis of nicotine. As early as 1828, the natural nicotine was first isolated from tobacco by German chemists Posselt and Reimann, and in 1904, the nicotine was experimentally synthesized for the first time by A. Pictet and Crepieux. After more than one hundred years of development, there have been many research reports on the chemical preparation of (S)-nicotine. Currently, there are mainly two kinds of approaches for the chemical synthesis of (S)-nicotine. In the first method, a racemic nicotine is synthesized first, and then undergo chiral resolution to obtain (S)-nicotine. This method has simple synthesis, but it involves large consumption of chiral selectors, leading to complicated separation and purification and increased cost (Tungstate-catalyzed oxidation of secondary amines to nitrones. α-Substitution of secondary amines via nitrones. *Journal of Organic Chemistry*, 1990, 55, 1736-1744; Synthesis of nornicotine, nicotine and other functionalised derivatives using solid-supported reagents and scavengers. *Journal of the Chemical Society, Perkin Transactions I*, 2002(2), 143-154; Synthesis of nicotine and diverse analogues using intramolecular [3+2] cycloaddition. *Synlett*, 2009(15), 2497-2499; A new and efficient approach to the synthesis of nicotine and anabasine analogues. *Journal of Heterocyclic Chemistry*, 2009, 46(6), 1252-1258; Chinese patent publication No. 102617547A; and Chinese patent publication No. 107406411A).

With regard to the second method, (S)-nicotine with optical activity is prepared directly by asymmetric synthesis without additional chiral selectors. However, these methods are not suitable for the large-scale preparation of (S)-nicotine due to the high cost, and it still has not been reported on the commercial synthesis of (S)-nicotine. Chavdarian et al. (Synthesis of optically active nicotinoids[J]. *J. org. chem,* 1982, 47(6):1069-1073) reported the asymmetric synthesis of (S)-nicotine for the first time (reaction route 1), in which (L)-proline was used as the raw material to prepare a chiral amino alcohol, and then the chiral amino alcohol underwent five steps of reaction to produce the target product (S)-nicotine. However, the target product (S)-nicotine only had 24% ee.

Route 1

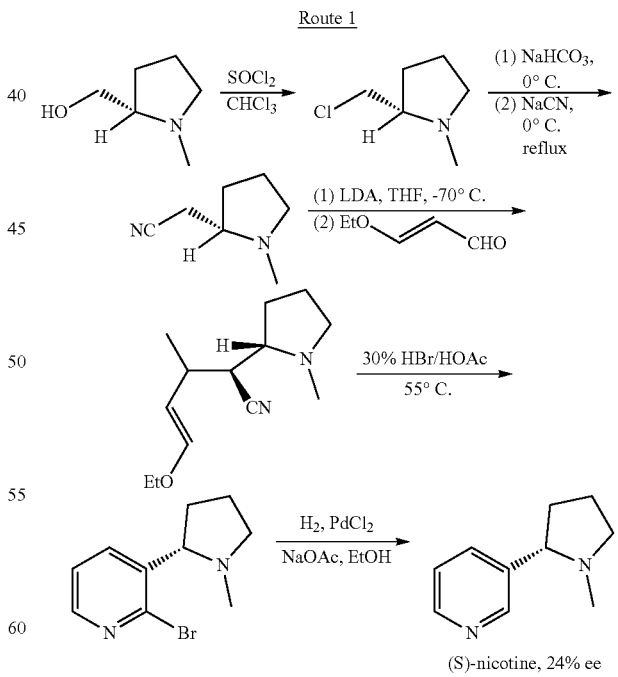

Helmchen et al. (Enantioselective synthesis of (+)(R)- and (−)(S)-nicotine based on Ir-catalysed allylic amination.[J]. *Organic & Biomolecular Chemistry*, 2005, 3(18):3266-3268) reported an asymmetric synthesis of (S)-nicotine by catalyzing the reductive amination of allyl with metal iridium, and the ee value was as high as 99% (reaction route 2).

Route 2

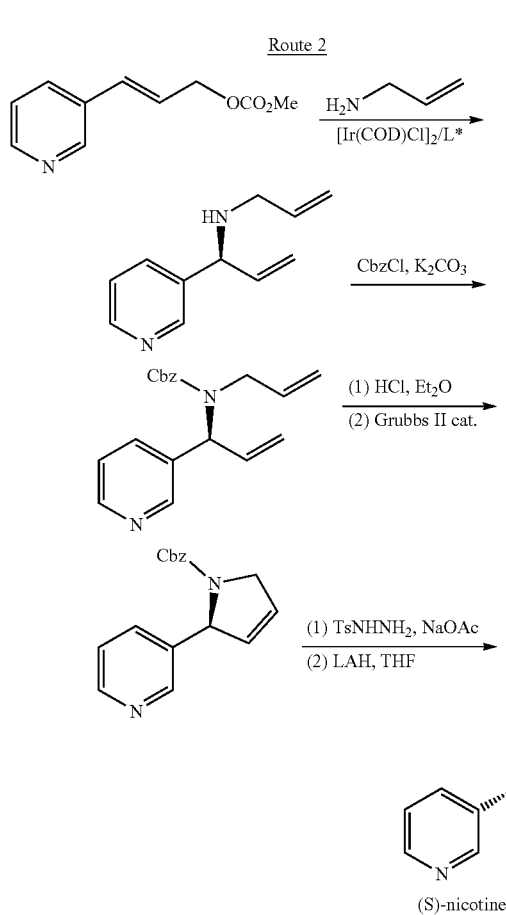

(S)-nicotine, 99% ee

O'Brien et al. (Enantioselective, palladium-catalyzed α-arylation of N-Boc pyrrolidine: in situ react IR spectroscopic monitoring, scope, and synthetic applications.[J]. *Journal of Organic Chemistry*, 2011, 76(15):5936-5953) reported an asymmetric synthesis of (S)-nicotine from readily-available N-Boc-tetrahydropyrrole through Negishi coupling reaction consisting of lithiation, transmetalation and metal palladium catalysis, and the ee value was as high as 84% (reaction route 3).

Route 3

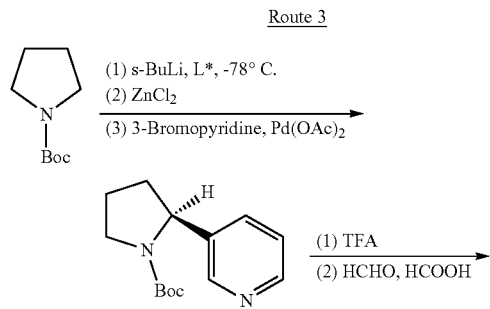

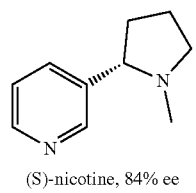

(S)-nicotine, 84% ee

L*

Chinese patent publication No. 104341390A disclosed the use of an iridium-phosphooxazoline chiral catalyst to catalyze the hydrogenation of a cyclic imine containing a pyridine group, so as to obtain a chiral intermediate with a high ee value, which then underwent a two-step reaction to form (S)-nicotine with 98% ee (reaction route 4).

Route 4

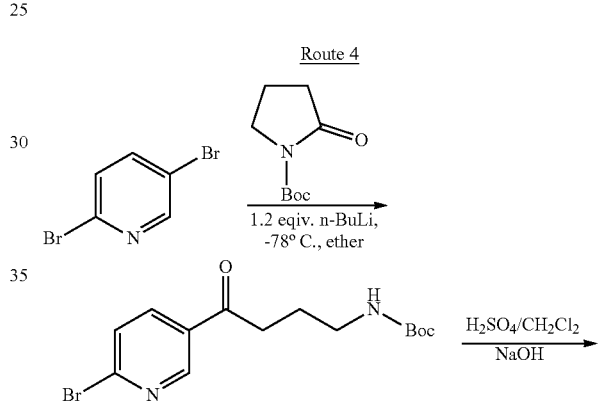

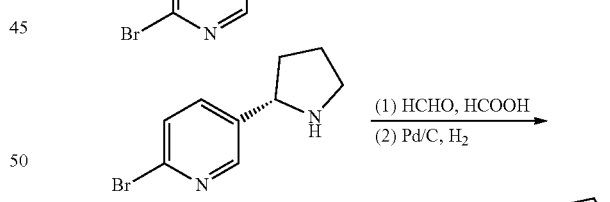

(S)-nicotine, 98% ee

To sum up, the existing asymmetric synthesis methods of (S)-nicotine not only require expensive reagents and low-temperature reaction condition, but also have multiple reaction steps and complex separation and purification operations, allowing for high cost. Therefore, the above-mentioned methods are not suitable for the industrial production.

SUMMARY

An object of this application is to provide a method for efficiently preparing nicotine. Specifically, a pyridinyl alkyl ketone is asymmetrically reduced to obtain a chiral alcohol intermediate with high reactivity and stereoselectivity, which then undergo a two-step reaction to obtain the target product (S)-nicotine. The preparation route provided herein is economical.

In a first aspect, the present disclosure provides a method for preparing an intermediate of formula (5) for the preparation of nicotine, comprising: subjecting compound (4) to asymmetric reduction in the presence of a catalyst to produce the intermediate (5), as shown in the following reaction scheme:

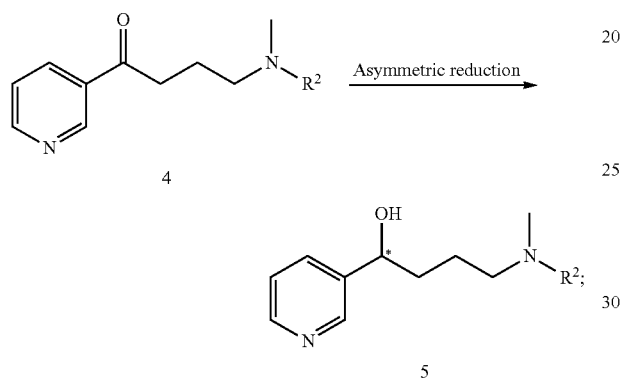

wherein $R^2$ is selected from the group consisting of $C_{1-2}$ alkyl, heteroatom-substituted alkyl, aryl and amino-protecting group; the catalyst is prepared through complexation of a metal salt with a chiral ligand; the metal salt is an inorganic salt of a transition element selected from the group consisting of ruthenium, rhodium, iridium and palladium; and the chiral ligand is selected from the group consisting of:

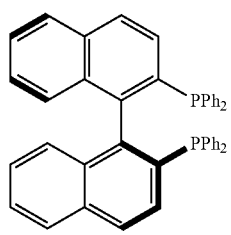

(S)-BINAP

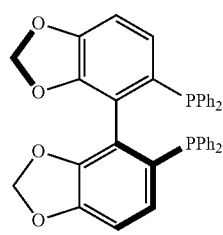

(S)-SegPhos

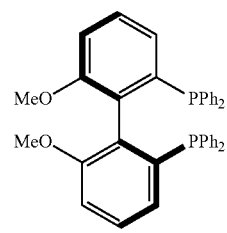

(S)-MeO-Biphep

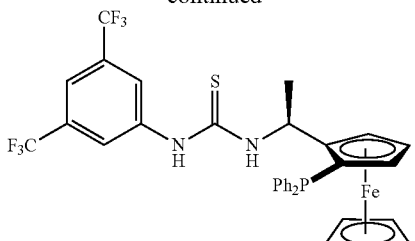

Zhaophos

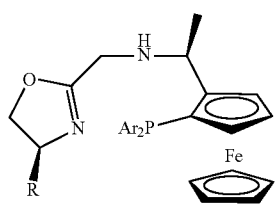

$(S_c, S_c, R_p)$-f-amphox

L1 Ar = Ph, R = Me
L2 Ar = Ph, R = $^i$Pr
L3 Ar = Ph, R = $^t$Bu
L4 Ar = Ph, R = Ph
L5 Ar = Ph, R = Bn
L6 Ar = 4-MeC$_6$H$_4$, R = $^t$Bu

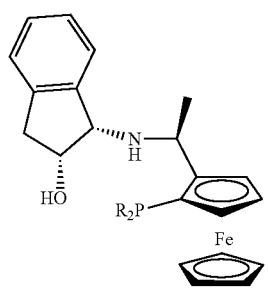

f-amphol
$(S_c, R_p, S, R)$-L7: R = Ph
$(S_c, R_p, S, R)$-L8: R = 3,5-($^t$Bu)$_2$C$_6$H$_3$
$(S_c, R_p, S, R)$-L9: R = Cy

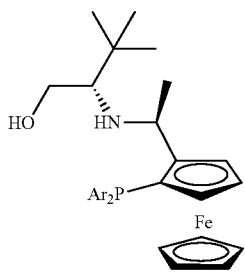

$(S_c, R_p, S, R)$-L10: Ar = Ph
$(S_c, R_p, S, R)$-L11: Ar = 3,5-($^t$Bu)$_2$C$_6$H$_3$

-continued

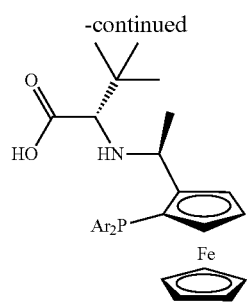

f-ampha (S_c, R_p, S, R)-L12: Ar = Ph
(S_c, R_p, S, R)-L13: Ar = 4-MeC_6H_4
(S_c, R_p, S, R)-L14: Ar = 3,5-(Me)_2C_6H_3
(S_c, R_p, S, R)-L15: Ar = 3,5-($^t$Bu)_2C_6H_3

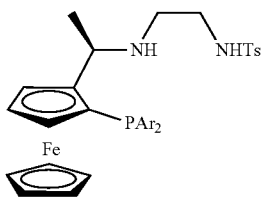

f-amphamide (R_c, S_p)-L16: Ar = Ph
(R_c, S_p)-L17: Ar = 3,5-($^t$Bu)_2C_6H_3

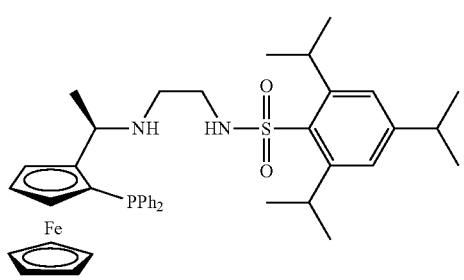

(R_c, S_p)-L18

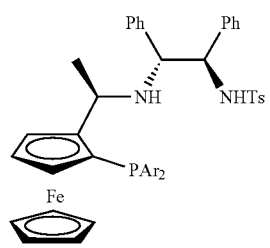

(R_c, S_p, R, R)-L19: Ar = 3,5-(Me)_2C_6H_3
(R_c, S_p, R, R)-L20: Ar = 3,5-($^t$Bu)_2C_6H_3

-continued

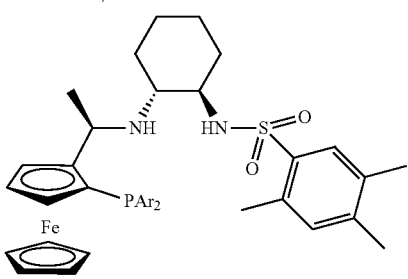

(R_c, S_p, R, R)-L21: R = Me
(R_c, S_p, R, R)-L22: R = Bn
(R_c, S_p, R, R)-L23: R = 2-thienyl
(R_c, S_p, R, R)-L24: R = 4-MeC_6H_4
(R_c, S_p, R, R)-L25: R = 2,4,6-Me_3C_6H_2
(R_c, S_p, R, R)-L26: R = 2,4,6-$^i$PrC_6H_2

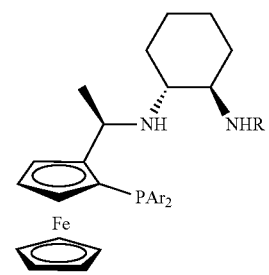

(R_c, S_p, R, R)-L27: Ar = 3,5-(Me)_2C_6H_2
(R_c, S_p, R, R)-L28: Ar = 3,5-($^t$Bu)_2C_6H_2

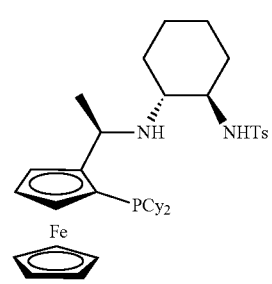

(R_c, S_p, R, R)-L29: Ar = 3,5(Me)_2C_6H_4, R = Ts
(R_c, S_p, R, R)-L30: Ar = 3,5-($^t$Bu)_2C_6H_3, R = Ts
(R_c, S_p, R, R)-L31: Ar = 3,5-(MeO)_2C_6H_3, R = Ts
(R_c, S_p, R, R)-L32: Ar = 2-furyl, R = Ts
(R_c, S_p, R, R)-L33: Ar = 3,5-($^t$Bu)_2C_6H_3, R = H (R_c, S_p, R, R)-L34

-continued
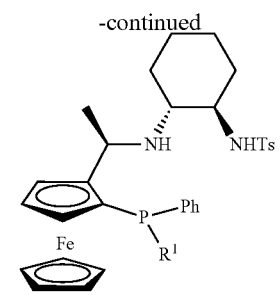
($R_c$, $S_p$, R, R)-L35: $R^1$ = Cy
($R_c$, $S_p$, R, R)-L36: $R^1$ = $^t$Bu
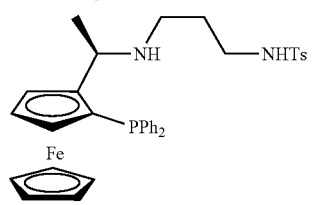
($R_c$, $S_p$)-L37
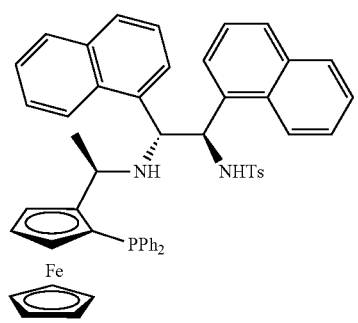
($R_c$, $S_p$, R, R)-L38
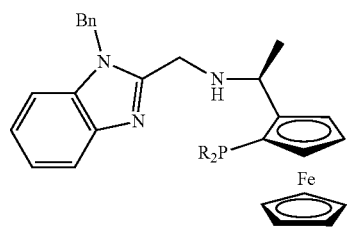
($S_c$, $R_p$)-L39: R = Ph
($S_c$, $R_p$)-L40: R = 3,5-($^t$Bu)$_2$C$_6$H$_3$
($S_c$, $R_p$)-L41: R = $^i$Pr
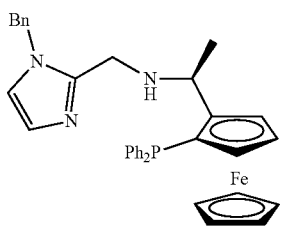
($S_c$, $R_p$)-L42
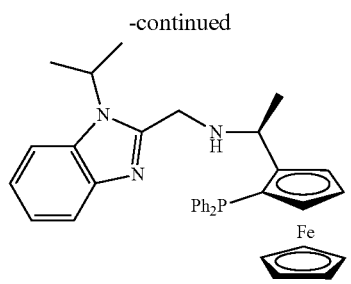
($S_c$, $R_p$)-L43
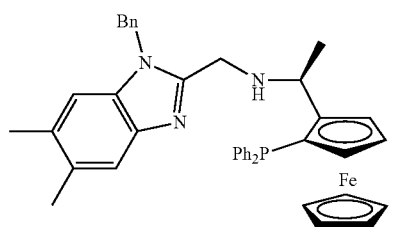
($S_c$, $R_p$)-L44
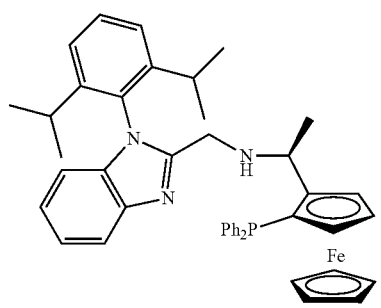
($S_c$, $R_p$)-L45
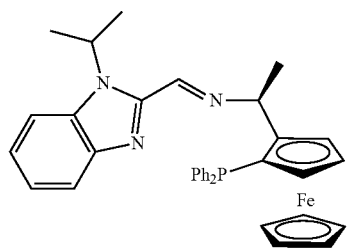
($S_c$, $R_p$)-L46
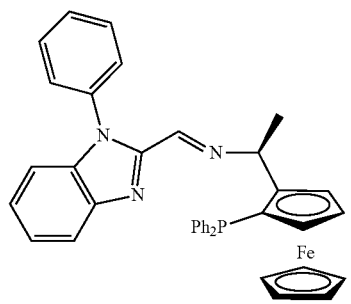
($S_c$, $R_p$)-L47

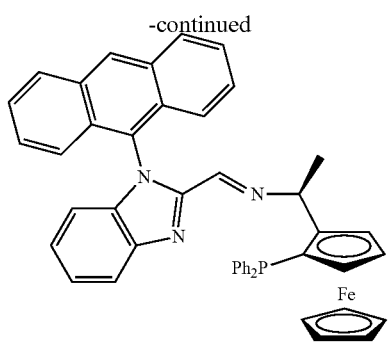

($S_c$, $R_p$)-L48

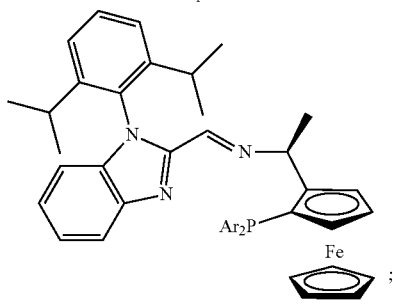

($S_c$, $R_p$)-L49: Ar = Ph
($S_c$, $R_p$)-L50: Ar = 2,4,6-Me$_3$C$_6$H$_2$ wherein a carbon atom specified by * is R or S configuration.

In some embodiments, the amino-protecting group is selected from the group consisting of benzyloxycarbonyl (Cbz), tert-butoxycarbonyl (Boc), fluorenylmethyloxycarbonyl (Fmoc), allyloxycarbonyl (Alloc), (trimethylsilyl)ethoxycarbonyl (Teoc), methoxycarbonyl, ethoxycarbonyl, phthaloyl (Pht), p-toluenesulfonyl (Ts), trifluoroacetyl (Tfa), nitrobenzenesulfonyl (Ns), pivaloyl, benzoyl, trityl (Trt), 2,4-dimethoxybenzyl (Dmb), p-methoxybenzyl (PMB) and benzyl (Bn).

In some embodiments, R$^2$ is preferably tert-butoxycarbonyl (Boc); a structure of the compound (4) is

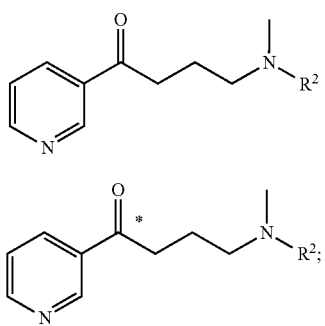

4 and a structure of the intermediate (5) is

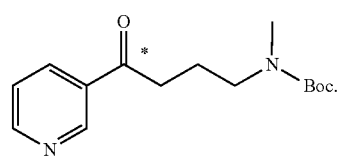

5

In some embodiments, the asymmetric reduction is performed in a solvent selected from the group consisting of methanol, ethanol, isopropanol, tetrahydrofuran, dichloromethane, toluene and a combination thereof.

In some embodiments, the asymmetric reduction is performed in the presence of a base; and the base is selected from the group consisting of potassium tert-butoxide, sodium tert-butoxide, lithium tert-butoxide, potassium hydroxide, sodium hydroxide, sodium carbonate, potassium carbonate, cesium carbonate and a combination thereof.

In some embodiments, the asymmetric reduction is performed at a temperature of 25-80° C. and a hydrogen pressure of 2-6 MPa for 16-24 h.

In a second aspect, this application provides a compound of formula (4) or formula (5):

4

5 wherein R$^2$ is selected from the group consisting of C$_{1-2}$ alkyl, heteroatom-substituted alkyl, aryl and amino-protecting group; the amino-protecting group is selected from the group consisting of benzyloxycarbonyl (Cbz), tert-butoxycarbonyl (Boc), fluorenylmethyloxycarbonyl (Fmoc), allyloxycarbonyl (Alloc), (trimethylsilyl)ethoxycarbonyl (Teoc), methoxycarbonyl, ethoxycarbonyl, phthaloyl (Pht), p-toluenesulfonyl (Ts), trifluoroacetyl (Tfa), nitrobenzenesulfonyl (Ns), pivaloyl, benzoyl, trityl (Trt), 2,4-dimethoxybenzyl (Dmb), p-methoxybenzyl (PMB) and benzyl (Bn); and the compound of formula (5) is R or S configuration.

In some embodiments, the compound of formula (4) is selected from the group consisting of:

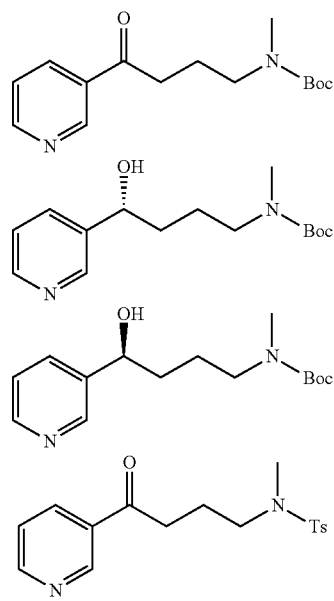

-continued

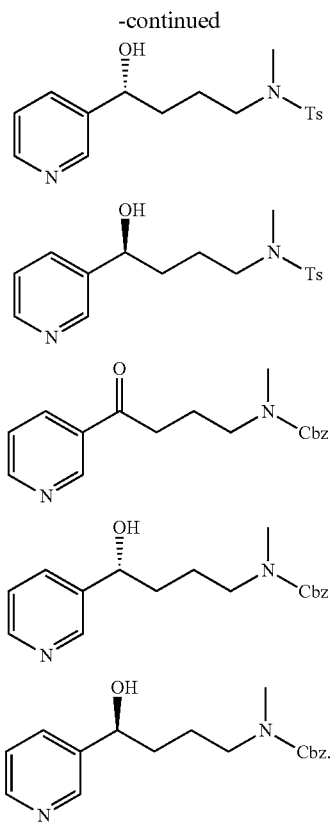

In some embodiments, the compound of formula (5) is selected from the group consisting of:

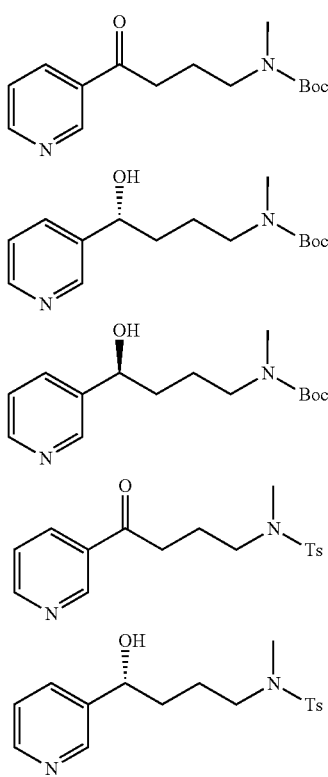

-continued

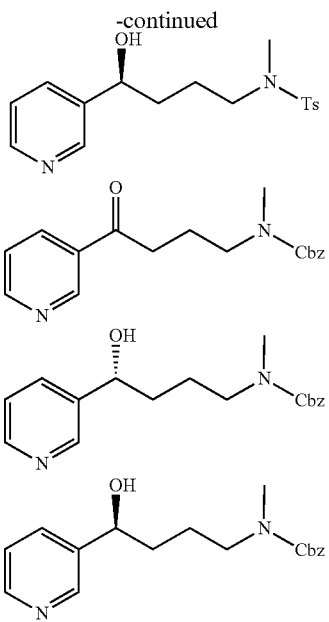

In some embodiments, the catalyst is [Ir(CD)Cl]$_2$; and the chiral ligand is:

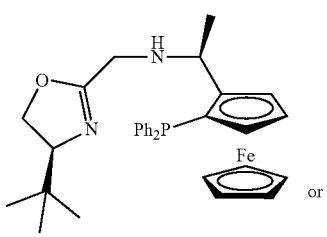

(S,S,R)-f-amphox-tBu

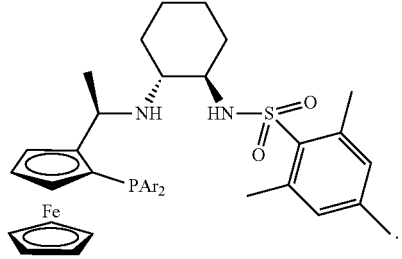

($R_c$,$S_p$,R,R)-L28: Ar = 3,5-($^t$Bu)$_2$C$_6$H$_3$

In a third aspect, this application further provides a method for preparing nicotine, comprising:

reacting a nicotinate (1) with N-methylpyrrolidone (2) in the presence of a base and HCl to produce 4-methylamino-1-(3-pyridine)-butanone hydrochloride (3); reacting the 4-methylamino-1-(3-pyridine)-butanone hydrochloride (3) with an amino-protecting reagent to produce a pyridyl alkyl ketone (4); subjecting the pyridyl alkyl ketone (4) to asymmetric reduction in the presence of a transition metal catalyst to produce an intermediate (5); subjecting the intermediate (5) to derivatization to produce a compound (6); and removing an amino-protecting group $R^2$ from the compound (6) followed by intramolecular cyclization under a basic condition to produce nicotine; as shown in the following reaction scheme:

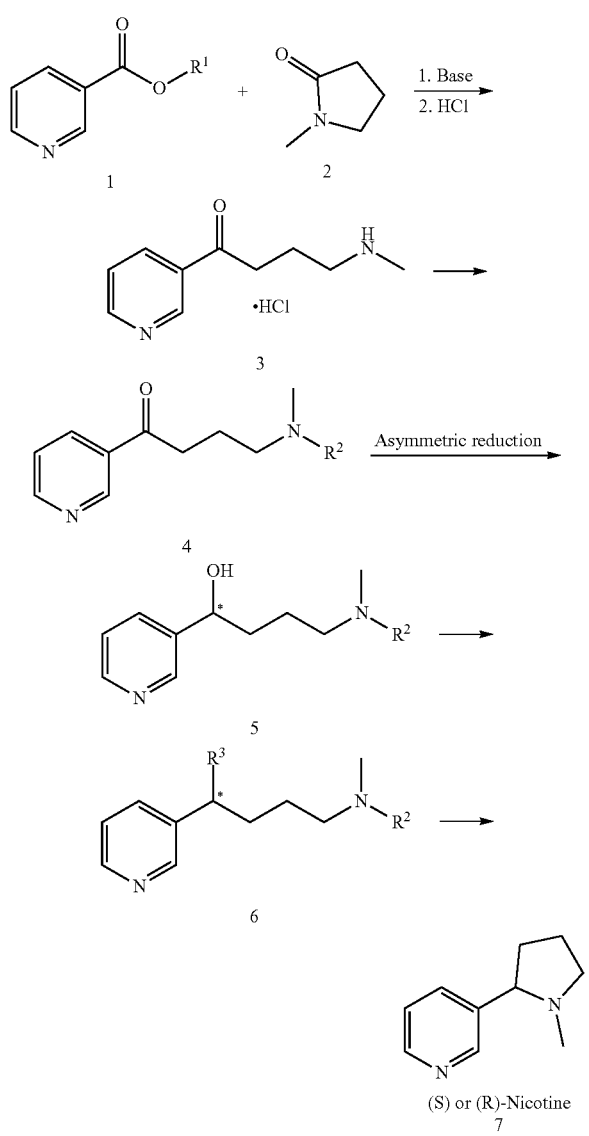

(S) or (R)-Nicotine
7 wherein the intermediate (5) is prepared by the above-mentioned method.

In some embodiments, the method comprises:

1) subjecting a nicotinic acid alkyl ester (1) and N-methylpyrrolidone (2) to a condensation reaction under a mild condition in the presence of an anhydrous solvent and a base to produce a condensation product; and heating the condensation product in the presence of HCl followed by purification in a solvent to obtain the 4-methylamino-1-(3-pyridine)-butanone hydrochloride (3);

wherein the nicotinic acid alkyl ester (3) comprises a short-chain alkyl group, and $R^1$ is a $C_{1-3}$ alkyl;

2) reacting 4-methylamino-1-(3-pyridine)-butanone hydrochloride (3) with the amino-protecting reagent to obtain the compound (4); wherein $R^2$ is selected from the group consisting of $C_{1-2}$ alkyl, heteroatom-substituted alkyl, aryl and amino-protecting group; and the amino-protecting group is selected from the group consisting of benzyloxycarbonyl (Cbz), tert-butoxycarbonyl (Boc), fluorenylmethyloxycarbonyl (Fmoc), allyloxycarbonyl (Alloc), (trimethylsilyl)ethoxycarbonyl (Teoc), methoxycarbonyl, ethoxycarbonyl, phthaloyl (Pht), p-toluenesulfonyl (Ts), trifluoroacetyl (Tfa), nitrobenzenesulfonyl (Ns), pivaloyl, benzoyl, trityl (Trt), 2,4-dimethoxybenzyl (Dmb), p-methoxybenzyl (PMB) and benzyl (Bn);

3) subjecting the compound (4) to the asymmetric reduction in the presence of the transition metal catalyst and a base in a solvent under hydrogen atmosphere in a reactor at room temperature; after the asymmetric reduction is completed, releasing gas in the reactor; and subjecting the reaction mixture to rotary evaporation and purification by silica gel column chromatography to obtain the intermediate (5); wherein the intermediate (5) is a chiral alcohol;

4) reacting the intermediate (5) with a reagent to convert an alcoholic hydroxy group of the intermediate (5) into $R^3$ to obtain the compound (6); wherein $R^3$ is a leaving group selected from the group consisting of halogen, sulfonate and phosphate; the halogen is selected from the group consisting of fluorine, chlorine, bromine and iodine; and the sulfonate is selected from the group consisting of mesylate (OMs), trifluoromethanesulfonate (OTf), p-toluenesulfonate (OTs) and nitrosulfonate (ONs); and 5) subjecting the compound (6) to deprotection in the presence of a reagent to remove the amino-protecting group $R^2$ followed by intramolecular nucleophilic cyclization under basic condition; subjecting the reaction mixture to extraction with ethyl acetate; collection and concentrating an organic phase to obtain a crude product; and subjecting the crude product to vacuum distillation to obtain (S)-nicotine.

In some embodiments, when $R^2$ is tert-butoxycarbonyl (Boc), the reagent for the deprotection is hydrochloric acid or trifluoroacetic acid.

In some embodiments, $R^1$ is ethyl.

In some embodiments, $R^3$ is OMs.

The beneficial effects of the disclosure are described as follows.

(1) In regard to the method provided herein for preparing nicotine, a pyridyl alkyl ketone undergoes an asymmetric hydrogenation under the catalysis to efficiently produce a chiral alcohol intermediate. The reaction has high stability and reactivity, and effectively realizes the steric control. An enantioselectivity of the chiral alcohol intermediate is greater than 99%.

(2) It has been demonstrated by extensive researches that the asymmetric hydrogenation has a high reactivity in the presence of the catalyst system Ir/f-amphox with a turnover number (TON) as high as 50,000.

(3) The method provided herein has simple operation, low cost and less energy consumption, and thus has a promising prospect in the industrial application.

DETAILED DESCRIPTION OF EMBODIMENTS

Figure 1:
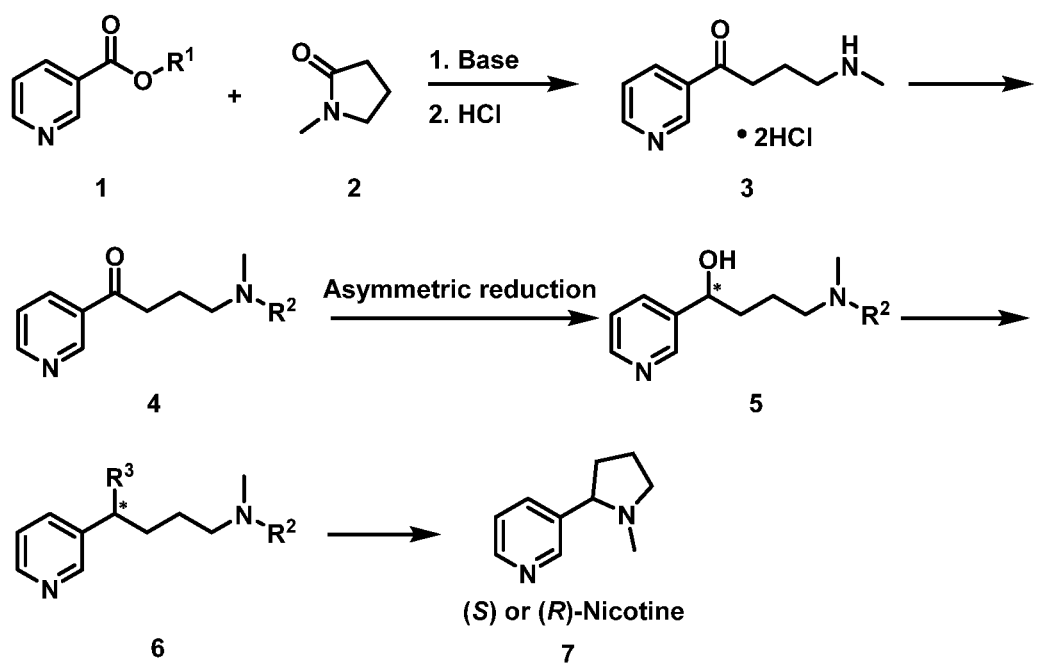
FIG. 1 depicts a synthesis route in accordance with an embodiment of the present disclosure.

The present disclosure will be further described in detail below with reference to the embodiments and accompanying drawings. The embodiments are illustrative, and not intended to limit the disclosure. Unless otherwise specified, experiments in the examples are conducted using a conventional approach under conventional conditions or as recommended by the manufacturer; and the materials and reagents used herein are all commercially available.

Example 1

Synthesis of Hydrogenation Product 5a
(S/C=10000; R²=Boc)

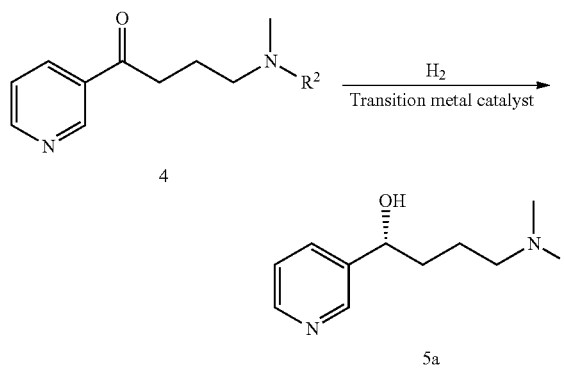

Under argon atmosphere, [Ir(COD)Cl]₂ (3.4 mg, 0.005 mol) and a chiral ligand f-amphox-ᵗBu-L3 (5.8 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a had a yield of 98% and 99% ee.

Example 2

Synthesis of Hydrogenation Product 5b(S/C=10000; R²=Boc)

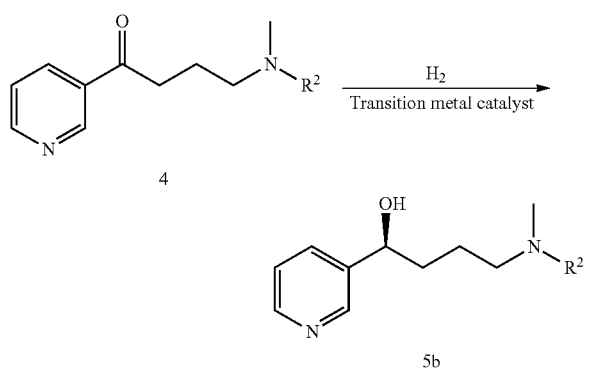

Under argon atmosphere, [Ir(COD)Cl]₂ (3.4 mg, 0.005 mol) and a chiral ligand f-amphox-ᵗBu-L3 (5.8 mg, 0.0105 mmol) that had an opposite configuration of Example 1 were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5b had a yield of 99% and an ee value of more than 99%.

Example 3

Synthesis of Hydrogenation Product 5a
(S/C=10000; R²=Boc)

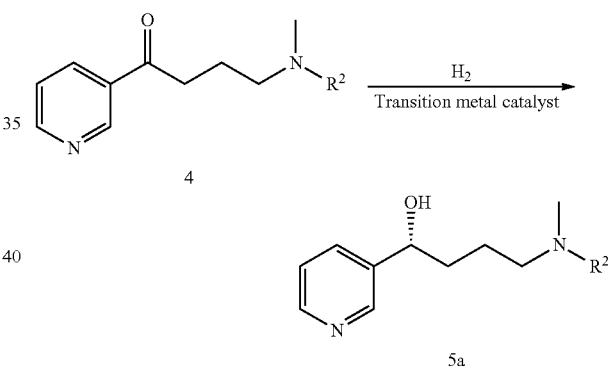

Under argon atmosphere, [Ir(COD)Cl]₂ (3.4 mg, 0.005 mol) and a chiral ligand f-amphox-ᵗBu-L3 (5.8 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and potassium carbonate (5 mg, 0.036 mmol).

The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a had a yield of 99% and an ee value of more than 99%.

Example 4

Synthesis of Hydrogenation Product 5a
(S/C=10000; R²=Boc)

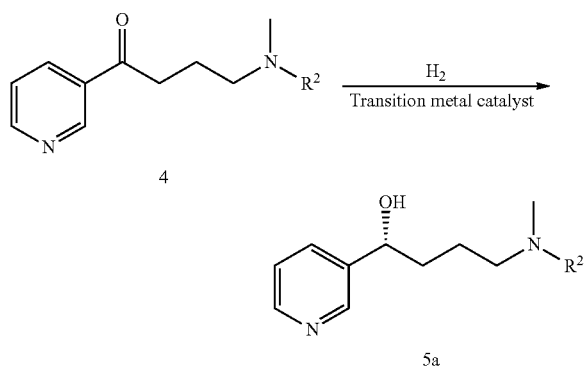

Under argon atmosphere, [Ir(COD)Cl]$_2$ (3.4 mg, 0.005 mol) and a chiral ligand f-amphox-$^t$Bu-L3 (5.8 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and sodium hydroxide (1.4 mg, 0.036 mmol).

The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a had a yield of 98% and an ee value of 99%.

Example 5

Synthesis of Hydrogenation Product 5a
(S/C=50000; R²=Boc)

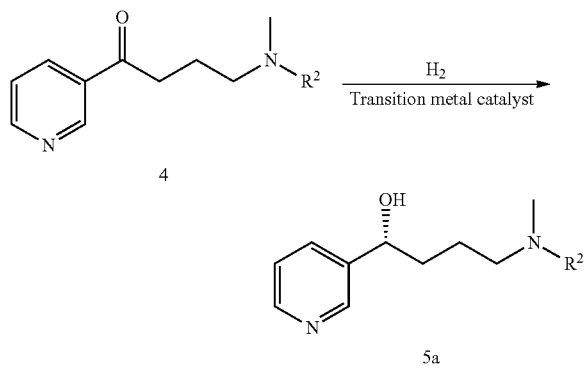

Under argon atmosphere, [Ir(COD)Cl]$_2$ (3.4 mg, 0.005 mol) and a chiral ligand f-amphox-$^t$Bu-L3 (5.8 mg, 0.0105 mmol) were dissolved with 4 mL of isopropanol, and stirred at room temperature for 3 h to obtain a clear solution. 29 μL of the orange solution was pipetted, and added into a mixed system consisting of compound 4 (1 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen.

The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a had a yield of 99% and an ee value of more than 99%.

Example 6

Synthesis of Hydrogenation Product 5a
(S/C=10000; R²=Boc)

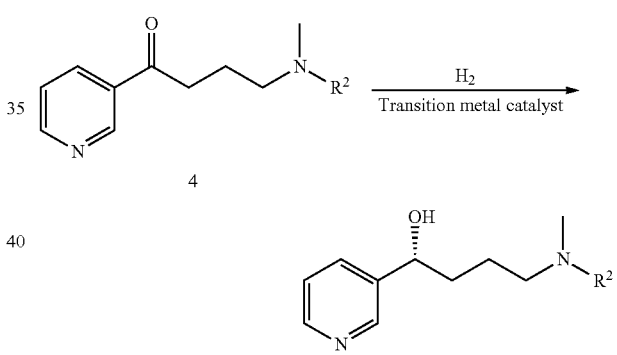

Under argon atmosphere, [Ir(COD)Cl]$_2$ (3.4 mg, 0.005 mol) and a chiral ligand f-amphol-L8 (7.9 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and potassium tert-butoxide (4 mg, 0.036 mmol). The reaction mixture was added into an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired 5a had a yield of 99% and an ee value of 89%.

Example 7

Synthesis of Hydrogenation Product 5a
(S/C=10000; $R^2$=Boc)

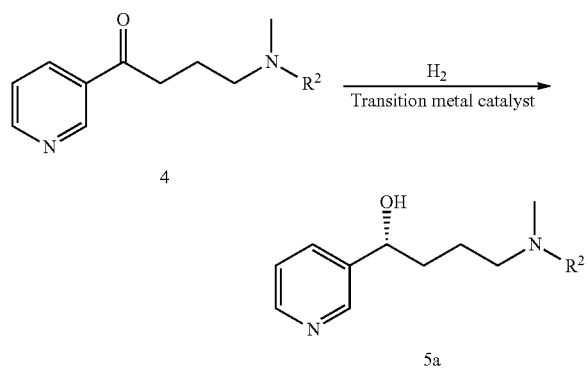

Under argon atmosphere, [Ir(COD)Cl]$_2$ (3.4 mg, 0.005 mol) and a chiral ligand f-ampha-L15 (8.1 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a had a yield of 99% and an ee value of 66%.

Example 8

Synthesis of Hydrogenation Product 5a
(S/C=10000; $R^2$=Boc)

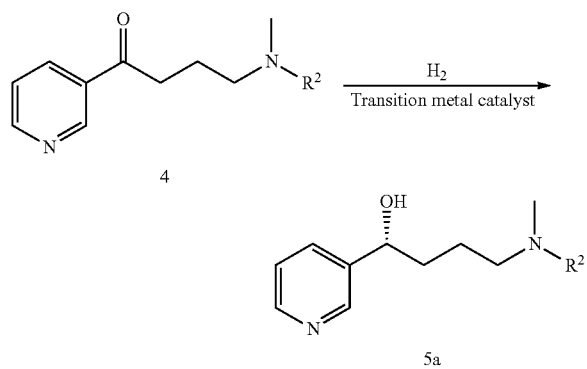

Under argon atmosphere, [Ir(COD)Cl]$_2$ (3.4 mg, 0.005 mol) and a chiral ligand f-amphamide-L16 (6.4 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a had a yield of 99% and an ee value of 96%.

Example 9

Synthesis of Hydrogenation Product 5a
(S/C=10000; $R^2$=Boc)

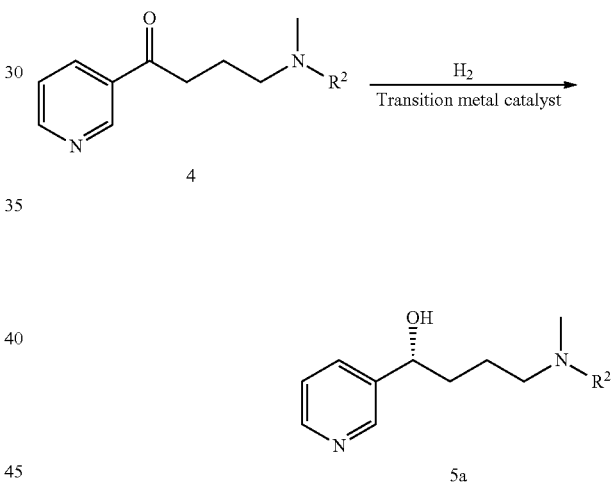

Under argon atmosphere, [Ir(COD)Cl]$_2$ (3.4 mg, 0.005 mol) and a chiral ligand f-amphamide-L17 (8.8 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a had a yield of 99% and an ee value of 99%.

Example 10

Synthesis of Hydrogenation Product 5a
(S/C=10000; R²=Boc)

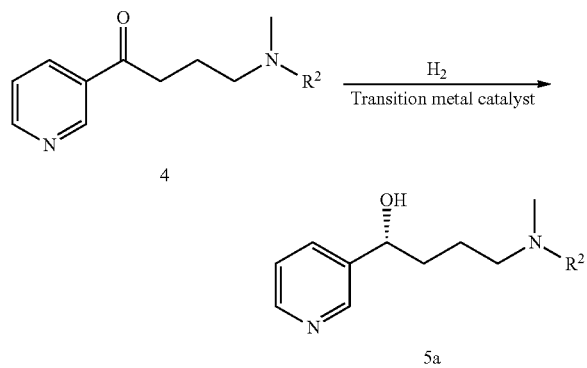

Under argon atmosphere, [Ir(COD)Cl]₂ (3.4 mg, 0.005 mol) and a chiral ligand (Rc, Sp, R, R)-L28 (7.3 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a had a yield of 99% and an ee value of 99%.

Example 11

Synthesis of Hydrogenation Product 5b
(S/C=10000; R²=Boc)

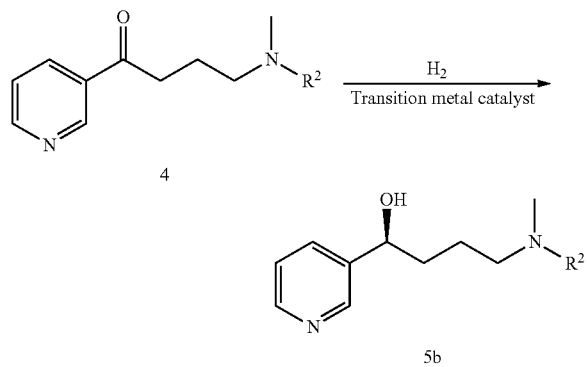

Under argon atmosphere, [Ir(COD)Cl]₂ (3.4 mg, 0.005 mol) and a chiral ligand (Rc, Sp, R, R)-L28 (7.3 mg, 0.0105 mmol) that has an opposite configuration of Example 10 was added into 4 mL of isopropanol, and stirred at room temperature for 3 h to obtain an apparent orange solution. 145 μL of the orange solution was pipetted, and mixed with intermediate 4 (1 g, 3.6 mmol), isopropanol (2 mL) and potassium tert-butoxide (4 mg, 0.036 mmol) to obtain a reaction mixture. The reaction mixture was added into an autoclave. Gas in the autoclave was replaced with hydrogen three times, and then the autoclave was filled with 40 atm hydrogen. A reaction was performed at 50° C. for 24 h. After the reaction, the gas in the autoclave was slowly released, and 50 mL of dichloromethane was added into the autoclave. A product of the reaction was washed with water, and then washed with saturated saline solution. The washed product was dried by anhydrous sodium sulfate, and concentrated under vacuum to obtain 1.1 g of a red oily liquid. The hydrogenated product 5b had a yield of 99%, and an ee value determined by high performance liquid chromatography (HPLC) was 99%.

Example 12

Synthesis of Hydrogenation Product 5a-1
(S/C=10000; R²=Ts)

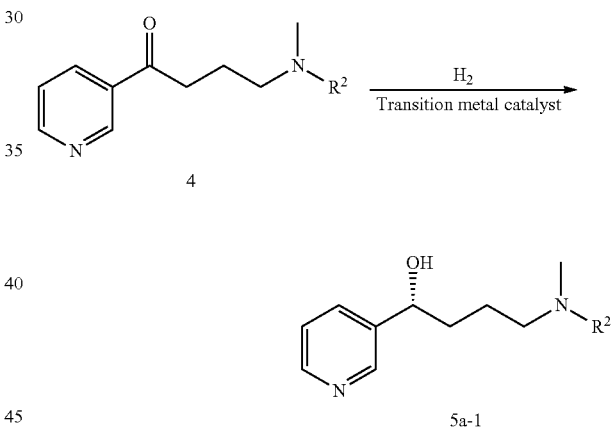

Under argon atmosphere, [Ir(COD)Cl]₂ (3.4 mg, 0.005 mol) and a chiral ligand f-amphox-ᵗBu-L3 (5.8 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1.2 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.2 g of a red oily liquid. As analyzed by high performance liquid chromatography (HPLC), the desired product 5a-1 had a yield of 99% and an ee value of 62%.

Example 13

Synthesis of Hydrogenation Product 5a-2 (S/C=10000; R²=Cbz)

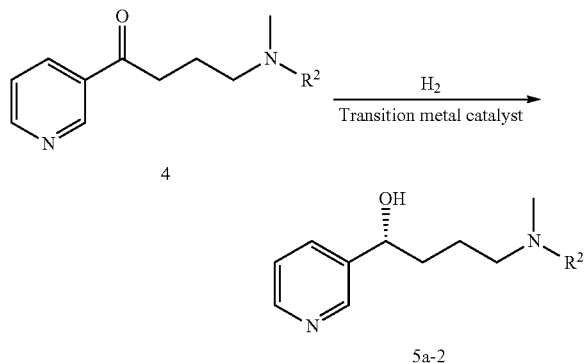

Under argon atmosphere, [Ir(COD)Cl]₂ (3.4 mg, 0.005 mol) and a chiral ligand f-amphox-ᵗBu-L3 (5.8 mg, 0.0105 mmol) were dissolved with 4 mL of isopropanol, and stirred at room temperature for 3 h to obtain a clear orange solution. 145 μL of the orange solution was pipetted, and added into a mixed system consisting of compound 4 (1.12 g, 3.6 mmol), isopropanol (2 mL) and potassium tert-butoxide (4 mg, 0.036 mmol). The reaction mixture was transferred to an autoclave. Gas in the autoclave was replaced with hydrogen three times, and then the autoclave was filled with 40 atm of hydrogen. The reaction mixture was reacted at 50° C. for 24 h. After the reaction was completed, the gas in the autoclave was slowly discharged, and the reaction mixture was added with 50 mL of dichloromethane, washed with water and saturated saline solution, dried with anhydrous sodium sulfate and concentrated under vacuum to obtain 1.1 g of a red oily liquid. As analyzed by high performance liquid chromatography (HPLC), the desired product 5a-2 had a yield of 98% and an ee value of 99%.

Example 14

Synthesis of 4-methylamino-1-(3-pyridine)-butanone Hydrochloride (R¹=ethyl)

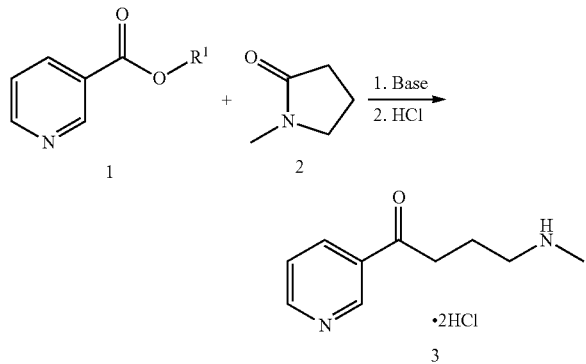

N-methylpyrrolidone 2 (5 g, 50 mmol) was dissolved with 50 mL of ultra-dry tetrahydrofuran, and then added with sodium hydride powder (6.05 g, 150 mmol, mass fraction 60%) in batches to obtain a reaction mixture. The reaction mixture was reacted under stirring at room temperature for 15 min. The reaction mixture was slowly added with ethyl nicotinate 1 (13.8 mL, 100 mmol) dropwise, and then heated to reflux. The reaction was continued for 24 h. Then the reaction mixture was placed in a cold bath at 0° C., and the reaction was quenched by dropping a concentrated hydrochloric acid (4M). Solid sodium hydroxide particles were added into the reaction mixture to adjust a reaction pH to about 4. The reaction mixture was extracted three times with 90 mL of dichloromethane, and an organic phase was obtained. The organic phase was dried by anhydrous sodium sulfate, and a solvent was removed under vacuum to obtain 10 g of a brown oily crude product. The crude product was added 100 mL of concentrated hydrochloric acid (5M), and was heated and refluxed for 72 h to obtain a reaction liquid. The reaction liquid was concentrated under vacuum, and added with 100 mL deionized water and then filtrated to obtain a brown solid residue. The brown solid residue was recrystallized with an EtOH/H₂O mixed system, so as to obtain 5.67 g of an off-white solid as the intermediate 3, the off-white solid (45% yield).

Example 15

Synthesis of Intermediate 4a-1 (R²=Boc)

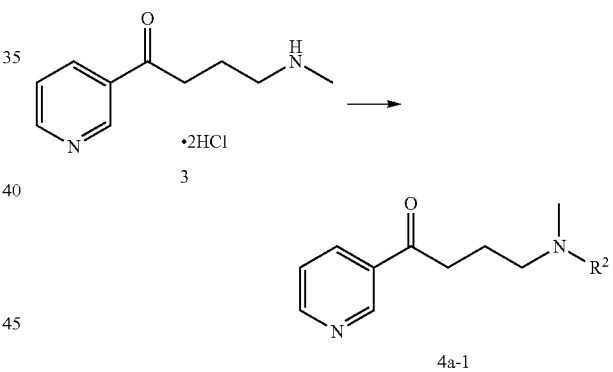

Intermediate 3 (66 g, 263 mmol) was dissolved with 500 mL of deionized water and 300 mL of dioxane, and then added with sodium carbonate powder (42 g, 395 mmol) during stirring to obtain a reaction mixture. The reaction mixture was stirred and reacted for 20 min, and was added with di-tert-butyl dicarbonate (63.2 g, 289.3 mmol) dropwise. Thin-layer chromatography was adopted to monitor the reaction mixture, and the reaction mixture was stirred and reacted at room temperature for 15 h. After the reaction, the dioxane solvent was removed under vacuum. Then the reaction mixture was extracted three times with 800 mL of ethyl acetate to obtain an organic phase. The organic phase was dried with anhydrous sodium sulfate, and the ethyl acetate was removed under vacuum. The organic phase was purified using a silica column, so as to obtain 60 g of a light-yellow oily liquid as the intermediate 4a-1 (83% yield).

¹HNMR (400 MHz, CDCl₃): δ 9.26-9.07 (m, 1H), 8.84-8.72 (m, 1H), 8.31-8.17 (m, 1H), 7.49-7.39 (m, 1H), 3.35 (t, J=6.8 Hz, 2H), 3.02 (t, J=7.0 Hz, 2H), 2.87 (s, 3H), 2.07-

1.92 (m, 2H), 1.41 (s, 9H). $^{13}$C {$^{1}$H}NMR (101 MHz, CDCl$_3$): δ 197.8, 155.6, 153.2, 149.3, 135.0, 131.8, 123.4, 79.1, 47.5, 35.3, 33.8, 28.1, 21.4.

Example 16

Synthesis of Intermediate 4a-2 (R$^2$=Ts)

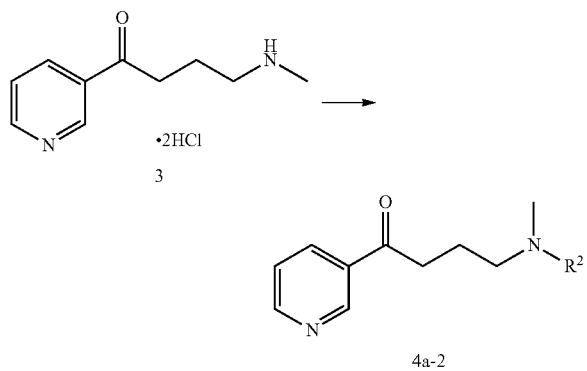

Intermediate 3 (6.6 g, 26.3 mmol) was dissolved with 50 mL of deionized water and 30 mL of dichloromethane, and then added with sodium carbonate powder (4.2 g, 39.5 mmol) during stirring to obtain a reaction mixture. The reaction mixture was stirred and reacted for 20 min, and an organic phase was separated out. Then p-toluenesulfonyl chloride (5.5 g, 29 mmol) was added dropwise into the organic phase. Thin-layer chromatography was adopted to monitor the reaction mixture, and the reaction mixture was stirred and reacted at room temperature for 5 h. After the reaction, the reaction mixture was washed with a saturated sodium carbonate solution. Organic phases were combined, dried with anhydrous sodium sulfate and concentrated. The concentrated organic phase was purified using a silica column, so as to obtain 3.6 g of a light-yellow solid as the intermediate 4a-2 (50% yield).

$^1$H NMR (400 MHz, CDCl$_3$): δ 9.25-9.10 (m, 1H), 8.86-8.73 (m, 1H), 8.30-8.21 (m, 1H), 7.70-7.62 (m, 2H), 7.47-7.39 (m, 1H), 7.34-7.28 (m, 2H), 3.23-3.02 (m, 4H), 2.74 (s, 3H), 2.42 (s, 3H), 2.13-1.93 (m, 2H). $^{13}$C {$^{1}$H}NMR (101 MHz, CDCl$_3$): δ 198.4, 153.5, 149.6, 143.4, 135.4, 134.3, 132.1, 129.7, 127.4, 123.6, 49.3, 35.3, 34.8, 21.5, 21.2.

Example 17

Synthesis of Intermediate 4a-3 (R$^2$=Cbz)

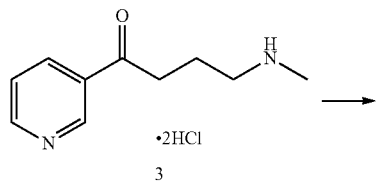

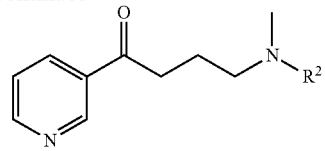

Intermediate 3 (6.6 g, 26.3 mmol) was dissolved with 50 mL of deionized water and 30 mL of dichloromethane, and then added with sodium carbonate powder (4.2 g, 39.5 mmol) during stirring to obtain a reaction mixture. The reaction mixture was stirred and reacted for 20 min, and an organic phase was separated out. Then benzyl chloroformate (4.9 g, 29 mmol) was added dropwise into the organic phase. Thin-layer chromatography was adopted to monitor the reaction mixture, and the reaction mixture was stirred and reacted at room temperature for 5 h. After the reaction, the reaction mixture was washed with a saturated sodium carbonate solution. Organic phases were combined, dried with anhydrous sodium sulfate and concentrated. The concentrated organic phase was purified using a silica column, so as to obtain 7 g of a light-yellow solid as the intermediate 4a-3 (85% yield).

Example 18

Synthesis of Intermediate (R)-6a-1 (R$^3$=Cl)

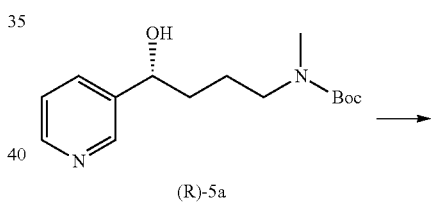

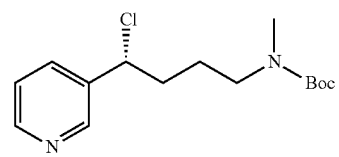

5.6 g (20 mmol) of the compound 5a was dissolved with 50 mL of dichloromethane to obtain a reaction mixture. The reaction mixture was placed in a cold bath at 0° C., and slowly added with 1.6 mL (22 mmol) of thionyl chloride dropwise during stirring. The reaction mixture was heated and refluxed for 2 h. After the reaction, the reaction mixture was washed with saturated sodium carbonate, extracted three times with 60 mL of dichloromethane, and purified using a silica column to obtain 5.6 g of a yellow oily liquid as the intermediate (R)-6a-1 (83% yield).

Example 19

Synthesis of Intermediate (S)-6a-1 (R³=Cl)

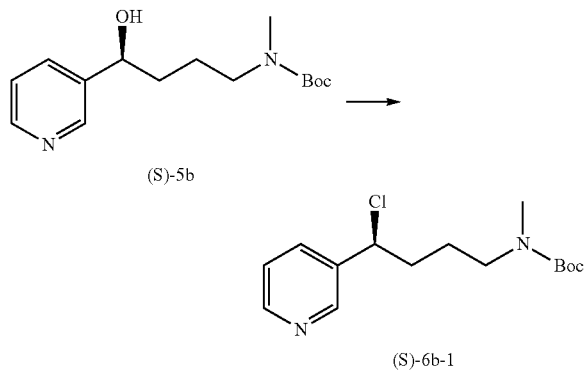

5.6 g (20 mmol) of the compound 5b was dissolved with 50 mL of dichloromethane to obtain a reaction mixture. The reaction mixture was placed in a cold bath at 0° C., and slowly added with 1.6 mL (22 mmol) of thionyl chloride dropwise during stirring. The reaction mixture was heated and refluxed for 2 h. After the reaction, the reaction mixture was washed with saturated sodium carbonate, extracted three times with 60 mL of dichloromethane, and purified using a silica column to obtain 5.9 g of a yellow oily liquid as the intermediate (S)-6b-1 (85% yield).

Example 20

Synthesis of Intermediate (R)-6a-2 (R³=OMs)

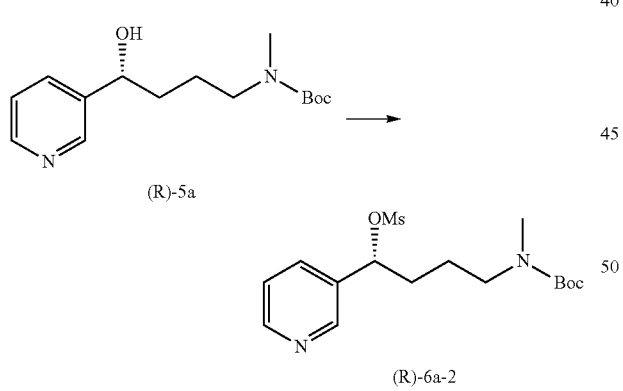

5.6 g (20 mmol) of the compound 5a was dissolved with 50 mL of dichloromethane and added 5.6 (40 mmol) of triethylamine dropwise to obtain a reaction mixture. The reaction mixture was placed in a cold bath at 0° C., and slowly added with 1.7 mL (22 mmol) of methanesulfonyl chloride dropwise during stirring. The reaction mixture was performed at 0° C. for 30 min. After the reaction, the reaction mixture was washed with saturated sodium carbonate, extracted three times with 60 mL of dichloromethane, and purified using a silica column to obtain 7.1 g of a yellow oily liquid as the intermediate (R)-6a-2 (98% yield).

Example 21

Synthesis of Intermediate (S)-6a-2 (R³=OMs)

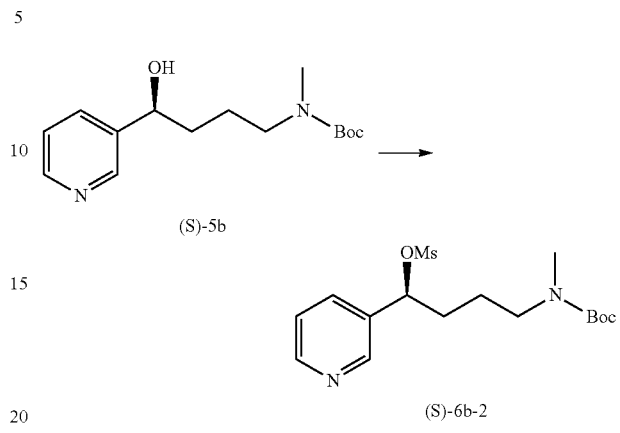

5.6 g (20 mmol) of the compound 5b was dissolved with 50 mL of dichloromethane and added 5.6 (40 mmol) of triethylamine dropwise to obtain a reaction mixture. The reaction mixture was placed in a cold bath at 0° C., and slowly added with 1.7 mL (22 mmol) of methanesulfonyl chloride dropwise during stirring. The reaction mixture was performed at 0° C. for 30 min. After the reaction, the reaction mixture was washed with saturated sodium carbonate, extracted three times with 60 mL of dichloromethane, and purified using a silica column to obtain 7 g of a yellow oily liquid as the intermediate (S)-6a-2 (96% yield).

Example 22

Synthesis of (S)-Nicotine 7 (R³=OMs)

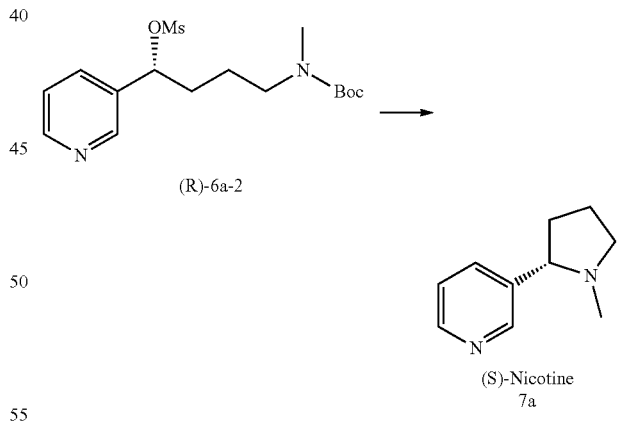

The intermediate (R)-6a-2 (7.2 g, 20 mmol) was dissolved with 50 mL concentrated hydrochloric acid (5M) dropwise and stirred at room temperature for 2 h. Then the mixture was dissolved by 100 mL of water, placed in a cold bath at 0° C., and added with 150 mL of a sodium hydroxide solution (2 M) dropwise during stirring. The reaction mixture was extracted three times with 150 mL of ethyl acetate to obtain an organic phase. The organic phase was dried by anhydrous sodium sulfate, and a solvent was removed under vacuum, so as obtain a yellow oily liquid. The yellow oily liquid was purified by distillation under vacuum to obtain 3 g of a colorless oily liquid as the (S)-Nicotine 7a, the colorless oily liquid (84% yield; ee 98%).

Figure 2:
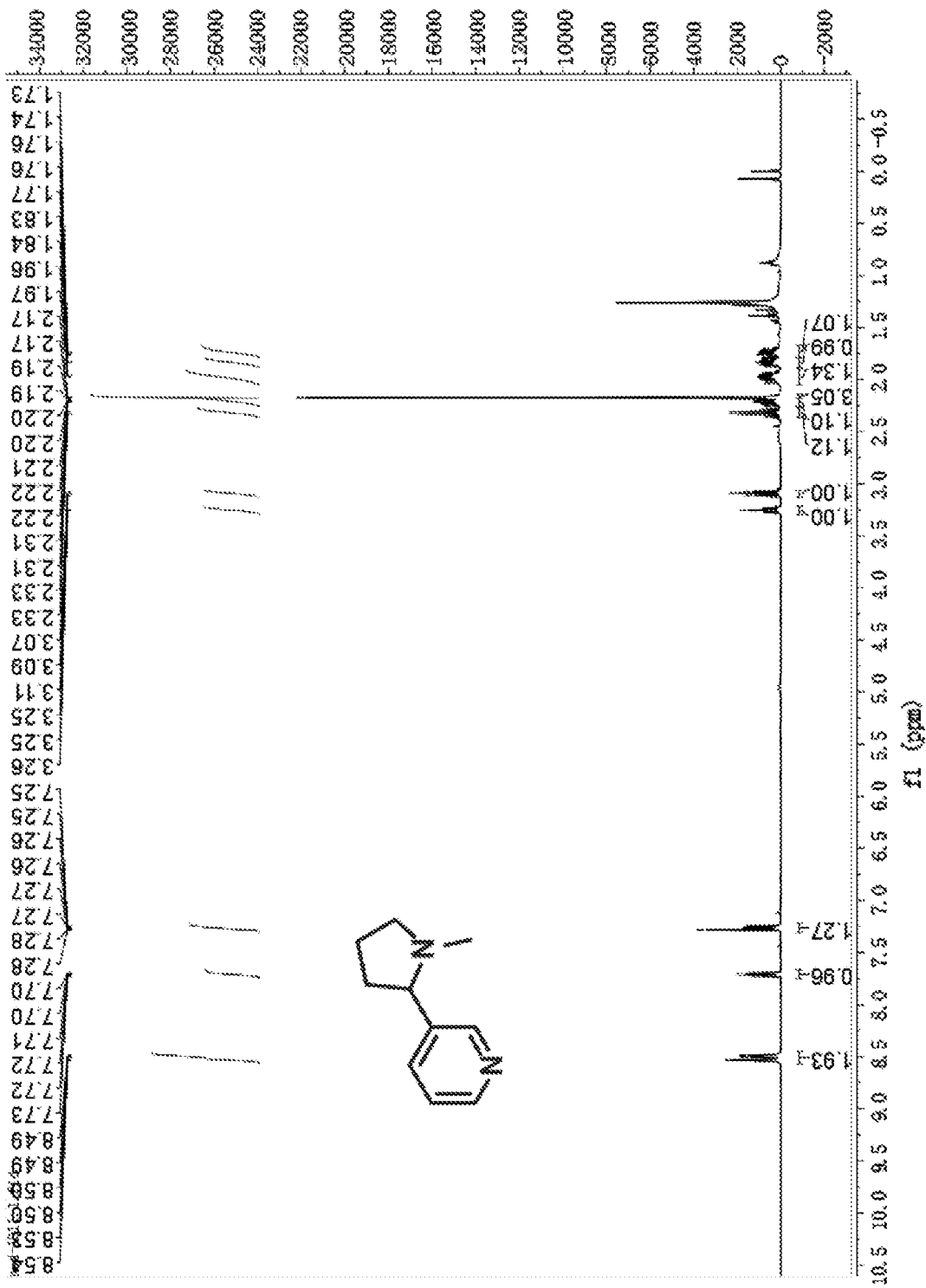
FIG. 2 is a $^1$H NMR spectrum (400 MHz, CDCl$_3$) of nicotine.
Figure 3:
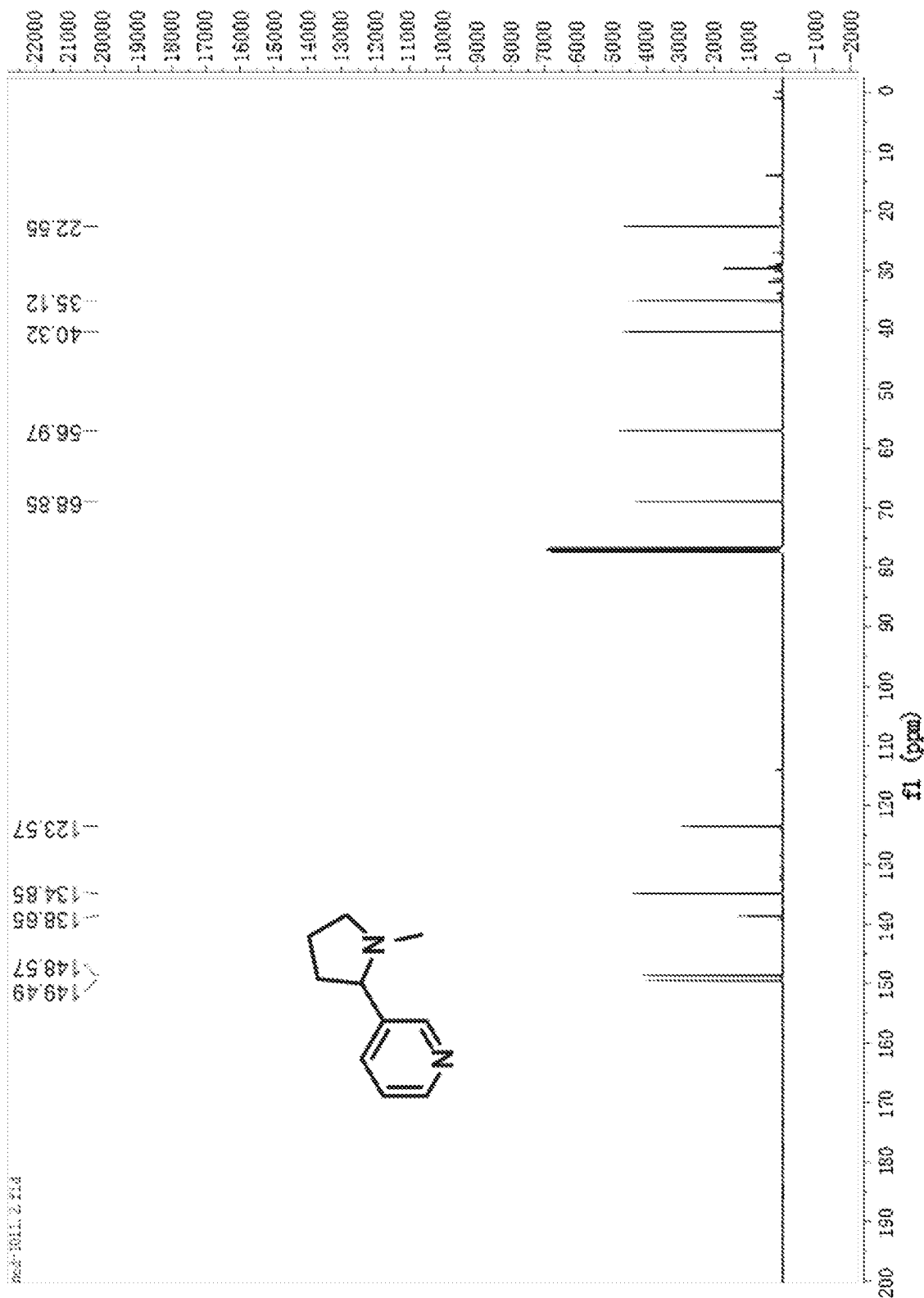
FIG. 3 is a $^{13}$C {$^1$H}NMR spectrum (101 MHz, CDCl$_3$) of nicotine.
Figure 4:
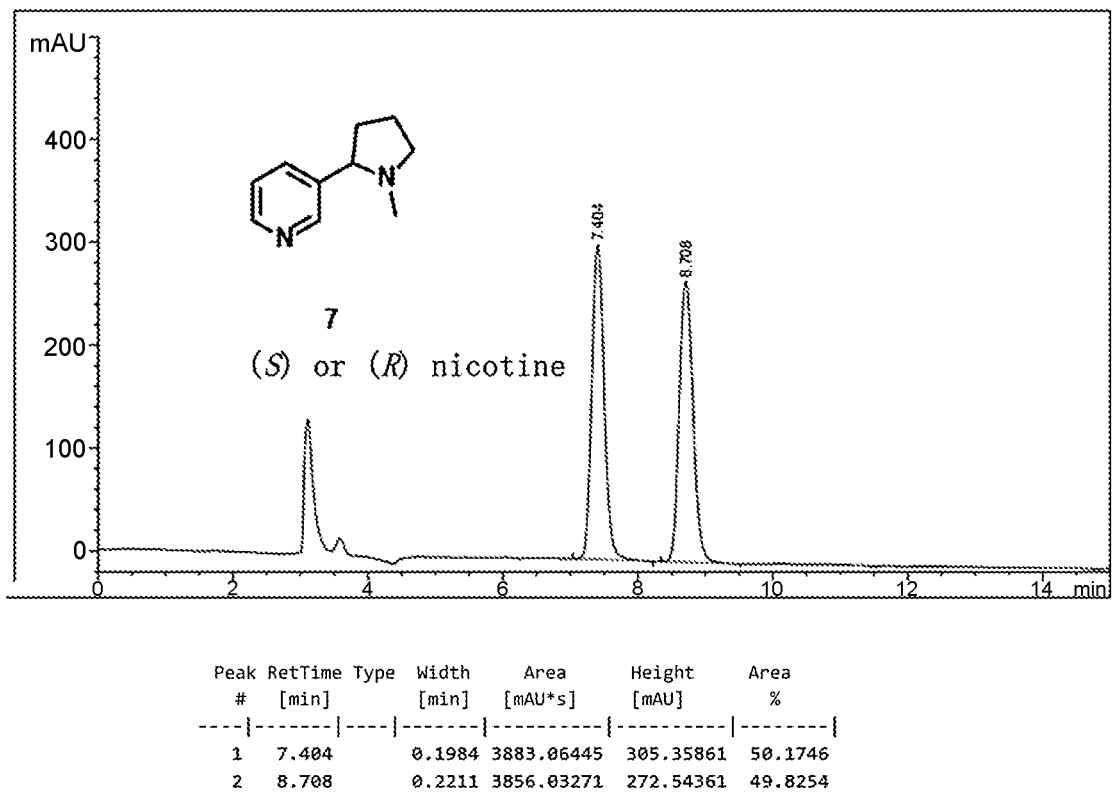
FIG. 4 is a HPLC spectrum of a nicotine raceme.

The synthesis route was referred to FIG. 1; FIG. 2 was a $^1$H NMR spectrum (400 MHz, CDCl$_3$) of nicotine; FIG. 3 was a $^{13}$C {$^1$H}NMR spectrum (101 MHz, CDCl$_3$) of nicotine; and FIG. 4 was a HPLC spectrum of a nicotine raceme.

Example 23

Synthesis of (R)-Nicotine 7 (R$^3$=OMs)

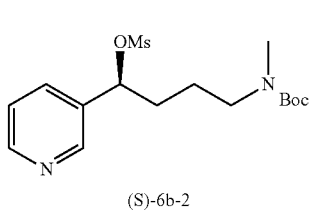

(S)-6b-2 → (R)-Nicotine 7b

The intermediate (S)-6b-2 (7.2 g, 20 mmol) was dissolved with 50 mL concentrated hydrochloric acid (5M) dropwise and stirred at room temperature for 2 h. Then the mixture was dissolved by 100 mL of water, placed in a cold bath at 0° C., and added with 150 mL of a sodium hydroxide solution (2 M) dropwise during stirring. The reaction mixture was extracted three times with 150 mL of ethyl acetate to obtain an organic phase. The organic phase was dried by anhydrous sodium sulfate, and a solvent was removed under vacuum, so as obtain a yellow oily liquid. The yellow oily liquid was purified by distillation under vacuum to obtain 2.9 g of a colorless oily liquid as the (R)-Nicotine 7b (80% yield; ee 98%).

Example 24

Synthesis of (S)-Nicotine 7 (R$^3$=Cl)

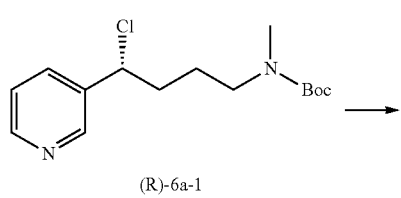

(R)-6a-1 → (S)-Nicotine 7a

The intermediate (S)-6b-1 (7.2 g, 20 mmol) was dissolved with 50 mL concentrated hydrochloric acid (5M) dropwise and stirred at room temperature for 2 h. Then the mixture was dissolved by 100 mL of water, placed in a cold bath at 0° C., and added with 150 mL of a sodium hydroxide solution (2 M) dropwise during stirring. The reaction mixture was extracted three times with 150 mL of ethyl acetate to obtain an organic phase. The organic phase was dried by anhydrous sodium sulfate, and a solvent was removed under vacuum, so as obtain a yellow oily liquid. The yellow oily liquid was purified by distillation under vacuum to obtain 3 g of a colorless oily liquid as the (S)-Nicotine 7a (yield 85%; ee 98%).

Example 25

Synthesis of (R)-Nicotine 7 (R$^3$=Chlorine Cl)

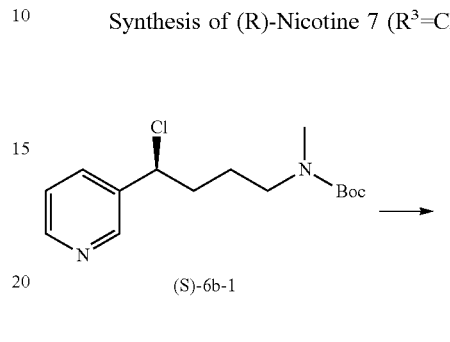

(S)-6b-1 → (R)-Nicotine 7b

The intermediate (R)-6a-1 (7.2 g, 20 mmol) was dissolved with 50 mL concentrated hydrochloric acid (5M) dropwise and stirred at room temperature for 2 h. Then the mixture was dissolved by 100 mL of water, placed in a cold bath at 0° C., and added with 150 mL of a sodium hydroxide solution (2 M) dropwise during stirring. The reaction mixture was extracted three times with 150 mL of ethyl acetate to obtain an organic phase. The organic phase was dried by anhydrous sodium sulfate, and a solvent was removed under vacuum, so as obtain a yellow oily liquid. The yellow oily liquid was purified by distillation under vacuum to obtain 2.9 g of a colorless oily liquid as the (R)-Nicotine 7b, the colorless oily liquid (82% yield; ee 98%).

Figure 5:
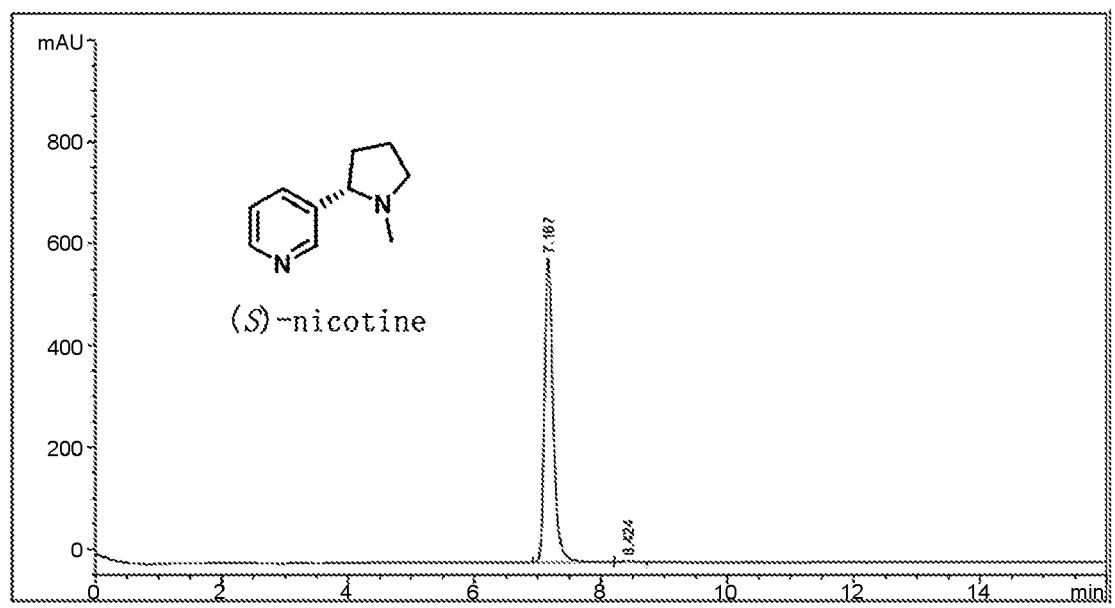
FIG. 5 is a HPLC spectrum of (S)-nicotine.

$[\alpha]^{25}{}_D$=−98.2 (c=1, CHCl$_3$), $^1$H NMR (400 MHz, CDCl$_3$): δ 8.56-8.47 (m, 2H), 7.75-7.67 (m, 1H), 7.27-7.23 (m, 1H), 3.32-3.21 (m, 1H), 3.10 (t, J=8.3 Hz, 1H), 2.39-2.28 (m, 1H), 2.28-2.19 (m, 1H), 2.17 (s, 3H), 2.04-1.91 (m, 1H), 1.89-1.79 (m, 1H), 1.78-1.66 (m, 1H). $^{13}$C {$^1$H}NMR (101 MHz, CDCl$_3$): δ 149.5, 148.6, 138.6, 134.9, 123.6, 68.9, 57.0, 40.3, 35.1, 22.6. HPLC: Chiralpak OD-H column, n-hexane (+0.1% diethanolamine)/isopropanol=98/2; flow rate=1.0 mL/min; UV 260 nm; t$_R$(S)=7.1 min (main peak), t$_R$ (R)=8.4 min (small peak). FIG. 5 was a HPLC spectrum of (S)-nicotine.

The above-mentioned embodiments are merely preferred embodiments of the disclosure, and not intended to limit the disclosure. Any changes, modifications, replacements, combinations and simplifications made by those skilled in the art without departing from the spirit of the present disclosure should fall within the scope of the disclosure defined by the appended claims.

What is claimed is:
1. A method for preparing formula (5), comprising:
subjecting compound (4) to asymmetric reduction in the presence of a catalyst to produce the intermediate (5), as shown in the following reaction scheme:

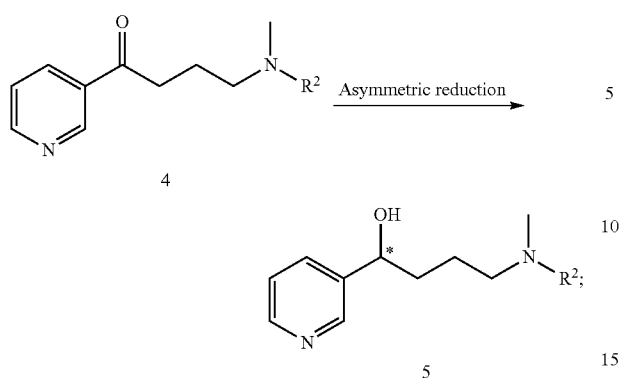

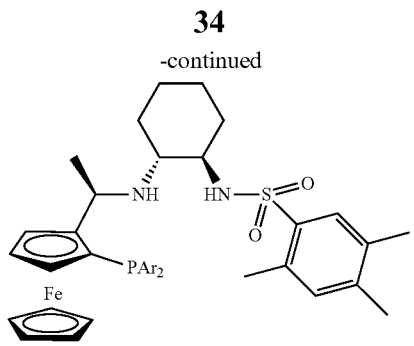

(R$_c$, S$_p$, R, R)-L27: Ar = 3,5-(Me)$_2$C$_6$H$_2$
(R$_c$, S$_p$, R, R)-L28: Ar = 3,5-($^t$Bu)$_2$C$_6$H$_2$ wherein R$^2$ is selected from the group consisting of C$_{1-2}$ alkyl, heteroatom-substituted alkyl, aryl and amino-protecting group; the catalyst is prepared through complexation of a metal salt with a chiral ligand; the metal salt is an inorganic salt of a transition element selected from the group consisting of iridium; and the chiral ligand is L3:

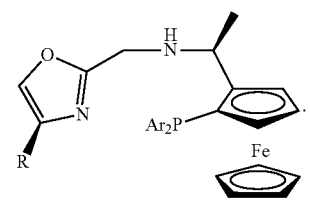

(S$_c$, S$_c$, R$_p$)-f-amphox

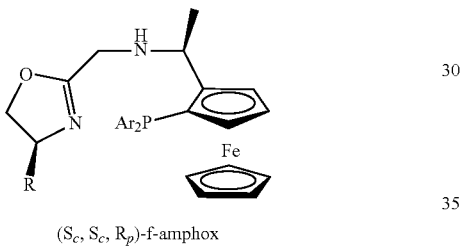

(S$_c$, S$_c$, R$_p$)-f-amphox
L1 Ar = Ph, R = Me
L2 Ar = Ph, R = $^i$Pr
L3 Ar = Ph, R = $^t$Bu
L4 Ar = Ph, R = Ph
L5 Ar = Ph, R = Bn
L6 Ar = 4-MeC$_6$H$_4$, R = $^t$Bu

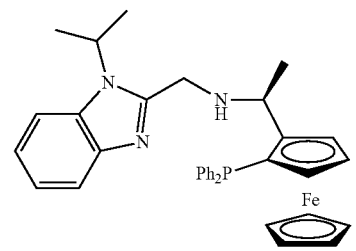

(S$_c$, R$_p$)-L43

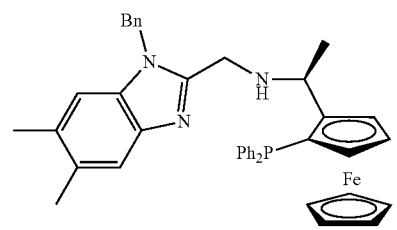

(S$_c$, R$_p$)-L44

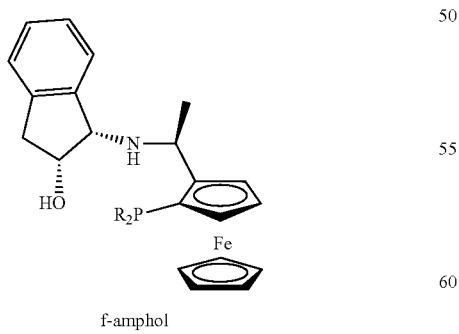

f-amphol
(S$_c$, R$_p$, S, R)-L7: R = Ph
(S$_c$, R$_p$, S, R)-L8: R = 3,5-($^t$Bu)$_2$C$_6$H$_3$
(S$_c$, R$_p$, S, R)-L9: R = Cy

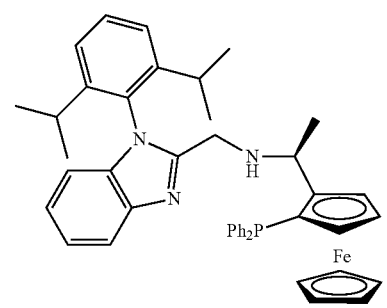

(S$_c$, R$_p$)-L45

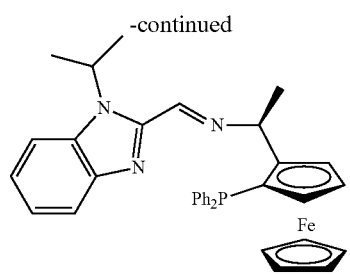

(S$_c$, R$_p$)-L46

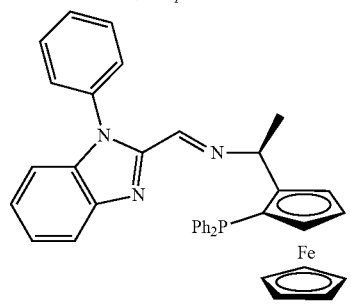

(S$_c$, R$_p$)-L47

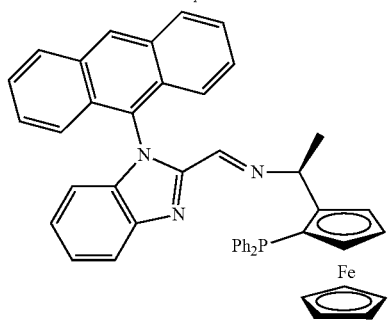

(S$_c$, R$_p$)-L48

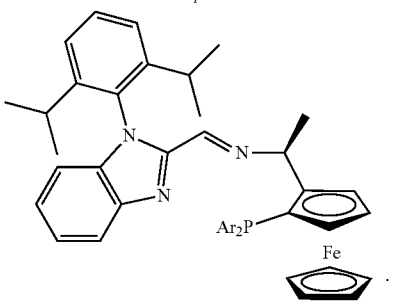

(S$_c$, R$_p$)-L49: Ar = Ph
(S$_c$, R$_p$)-L50: Ar = 2,4,6-Me$_3$C$_6$H$_2$ the asymmetric reduction is performed in the presence of a base; and the base is potassium carbonate.

2. The method of claim 1, wherein the amino-protecting group is selected from the group consisting of benzyloxycarbonyl (Cbz), tert-butoxycarbonyl (Boc), fluorenylmethyloxycarbonyl (Fmoc), allyloxycarbonyl (Alloc), (trimethylsilyl) ethoxycarbonyl (Teoc), methoxycarbonyl, ethoxycarbonyl, phthaloyl (Pht), p-toluenesulfonyl (Ts), trifluoroacetyl (Tfa), nitrobenzenesulfonyl (Ns), pivaloyl, benzoyl, trityl (Trt), 2,4-dimethoxybenzyl (Dmb), p-methoxybenzyl (PMB) and benzyl (Bn).

3. The method of claim 1, wherein the R$^2$ is preferably tert-butoxycarbonyl (Boc); a structure of the compound (4) is

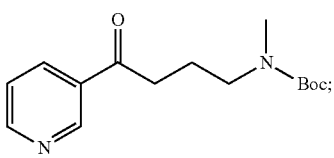

4 and a structure of the intermediate shown in formula (5) is

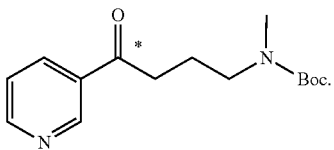

5

4. The method of claim 1, wherein the asymmetric reduction is performed in a solvent selected from the group consisting of methanol, ethanol, isopropanol, tetrahydrofuran, dichloromethane, toluene and a combination thereof.

5. The method of claim 1, wherein the asymmetric reduction is performed at a temperature of 25-80° C. and a hydrogen pressure of 2-6 MPa for 16-24 h.

* * * * *